United States Patent

Guzowski

[11] Patent Number: 5,823,389
[45] Date of Patent: Oct. 20, 1998

[54] APPARATUS AND METHOD FOR DISPENSING FLUID MATERIAL

[75] Inventor: Raymond J. Guzowski, Fenton, Mich.

[73] Assignee: Fanuc Robotics North America, Inc., Auburn Hills, Mich.

[21] Appl. No.: 773,141

[22] Filed: Dec. 26, 1996

[51] Int. Cl.⁶ .................................................. G01F 11/00
[52] U.S. Cl. .............................. 222/1; 222/63; 222/334
[58] Field of Search ............................. 222/1, 63, 129.2, 222/137, 145.1, 334, 386

[56] References Cited

U.S. PATENT DOCUMENTS

| Re. 35,010 | 8/1995 | Price | 222/1 |
|---|---|---|---|
| 3,216,627 | 11/1965 | Best et al. | 222/334 |
| 4,013,037 | 3/1977 | Warning, Sr. et al. | 118/2 |
| 4,516,700 | 5/1985 | Guzowski | 222/334 |
| 4,700,205 | 10/1987 | Rich et al. | 346/140 R |
| 4,842,162 | 6/1989 | Merkel | 222/1 |
| 4,922,852 | 5/1990 | Price | 118/683 |
| 4,953,754 | 9/1990 | Credle, Jr. | 222/129.2 |
| 4,987,854 | 1/1991 | Hall | 118/679 |
| 4,988,015 | 1/1991 | Price | 222/1 |
| 5,054,650 | 10/1991 | Price | 222/1 |
| 5,114,752 | 5/1992 | Hall | 427/273 |
| 5,465,880 | 11/1995 | Glynn | 222/321.8 |
| 5,476,193 | 12/1995 | Haynes | 222/334 |
| 5,711,483 | 1/1998 | Hays | 222/63 |

*Primary Examiner*—Joseph Kaufman
*Attorney, Agent, or Firm*—Howard & Howard

[57] ABSTRACT

An apparatus (50) and method for dispensing fluid material (55) from a dispensing gun (53) onto a workpiece (17) includes a metering cylinder (56) having a metering chamber formed therein with a pair of variable volume chamber portions (66,67), a valve assembly (52) connected to a supply of fluid material (51), the dispensing gun and to the chamber portions, and a control (58) connected to a meter actuator (60) connected to the metering cylinder and a valve actuator (59) connected to the valve assembly. The control (58) controls the meter actuator (60) and the valve actuator (59) in first and second modes of operation to dispense the fluid material (55) from the dispensing gun (53) by alternately drawing from the supply of fluid material (51) through the valve assembly into a first one of the chamber portions and forcing the fluid material from a second one of the chamber portions through the valve assembly to the dispensing gun. If the amount of material dispensed is less than the volume of the metering chamber, the control (58) controls the metering actuator (60) and the valve actuator (59) in a third mode of operation to force the fluid material in the metering cylinder (56) from one of the chamber portions into the other one of the chamber portions through the valve assembly (52) without forcing the fluid material from the valve assembly to the dispensing gun thereby resetting the dispensing apparatus.

14 Claims, 6 Drawing Sheets

APPARATUS AND METHOD FOR DISPENSING FLUID MATERIAL

BACKGROUND OF THE INVENTION

The present invention relates generally to an apparatus and method for dispensing fluid materials and, in particular, to a system for dispensing variable volumes of fluid materials onto workpieces.

Many manufacturing operations require the application of viscous materials such as adhesives, sealants, lubricants, etc. in a bead or spray pattern to a surface on a workpiece. The material must be applied as a specific amount or volume per unit length of the application path. In cases where the workpiece production rate is high and/or the application path is critical, the application is made by a dispensing apparatus mounted on a robot arm moved at a speed in accordance with the flow rate of the material being dispensed and the workpiece speed.

One type of material dispenser is the single acting shotmeter which is described in more detail below. A metering cylinder chamber of predetermined volume is filled with fluid material. During a work cycle, a metering rod or piston is actuated to dispense the material from the cylinder onto a workpiece and then the metering rod or piston is retracted to reload the cylinder as the finished workpiece is removed and a new workpiece is moved into place.

The cylinder chamber of the single acting shotmeter must be sized to accommodate a volume of fluid material to be sprayed in one work cycle. As the cycle speed is increased to accommodate greater manufacturing efficiencies, the fluid material reload flow rates must be increased. Large flow rates create large pressure drops in the fluid material supply lines and high pressure variations between the static and the dynamic supply pressures. These large pressure variations require the use of special equipment which is costly to purchase and to maintain.

The larger size single acting shotmeters also are restricted in use by being too heavy to permit mounting on the end of a robot arm and, therefore, cannot provide material metering close to the point of application in many instances. Large volume single acting shotmeters also lose resolution at low speeds thereby reducing the quality of the material application. Single acting shotmeters typically use a slide wire transducer to generate a position feedback signal which transducers are prone to failure. Such shotmeters also use a clamp on water jacket for temperature conditioning which adds weight and does not cover all of the plumbing and valves used to operate the shotmeter.

Another form of known fluid material application systems is a double acting shotmeter described in more detail below. Two components of a two component sealing system are supplied through separate valves to separate metering cylinders. The metering cylinders are of the type which has a piston movable in an internal chamber and are connected to a mixing gun. The two components are combined in the mixing gun and dispensed through a nozzle. The double acting shotmeter relies upon the material pressure to control flow rate and utilize valving which does not allow the pistons to move without dispensing material.

SUMMARY OF THE INVENTION

The present invention concerns an apparatus for dispensing fluid material from a dispensing gun onto a workpiece including a metering means having a metering chamber formed therein and a pair of inlet/outlet ports, the metering chamber having a pair of variable volume chamber portions each being in fluid communication with an associated one of the inlet/outlet ports, a valve means having an inlet port connectable to a supply of fluid material, an outlet port connectable to a dispensing gun, and a pair of inlet/outlet ports each connected to an associated one of the metering means inlet/outlet ports and being in fluid communication with an associated one of the chamber portions, and a control means connected to the metering means and to the valve means. When the valve means inlet port is connected in fluid communication with the supply of fluid material and the valve means outlet port is connected to the dispensing gun, the control means controls the metering means and the valve means in first and second modes of operation to dispense the fluid material from the dispensing gun. In the first mode of operation, the fluid material is drawn from the supply of fluid material through the valve means into a first one of the chamber portions and the fluid material is forced from a second one of the chamber portions through the valve means and out the valve means outlet port to the dispensing gun. In the second mode of operation, which alternates with the first mode of operation, the fluid material is drawn from the supply of fluid material through the valve means into the second one of the chamber portions and the fluid material is forced from the first one of the chamber portions through the valve means and out the valve means outlet port to the dispensing gun. In the case that the amount of material dispensed is less than the volume of the chamber, the control means controls the metering means and the valve means in a third mode of operation to force the fluid material in the metering means from one of the chamber portions into the other one of the chamber portions through the valve means without forcing the fluid material from the valve means outlet port to the dispensing gun thereby resetting the dispensing apparatus.

The method of the present invention includes the steps of: a. providing the metering means having the metering chamber formed therein and the pair of inlet/outlet ports, the metering chamber having the pair of variable volume chamber portions each being in fluid communication with an associated one of the inlet/outlet ports; b. providing the valve means having the inlet port, the outlet port and the pair of inlet/outlet ports each connected to an associated one of the metering means inlet/outlet ports and being in fluid communication with an associated one of the chamber portions, connecting the inlet port to the supply of fluid material and connecting the outlet port to the dispensing gun; c. providing the control means and connecting the control means to the metering means and to the valve means; d. operating the control means to control the metering means and the valve means in a first mode of operation to draw fluid material from the supply of fluid material through the valve means into a first one of the chamber portions and to force fluid material from a second one of the chamber portions through the valve means and out the valve means outlet port to the dispensing gun; e. operating the control means to control the metering means and the valve means in a second mode of operation to draw the fluid material from the supply of fluid material through the valve means into the second one of the chamber portions and to force the fluid material from the first one of the chamber portions through the valve means and out the valve means outlet port to the dispensing gun; and f. operating the control means to control the metering means and the valve means in a third mode of operation to force the fluid material in the metering means from one of the chamber portions into the other one of the chamber portions through the valve means without forcing the fluid material from the valve means outlet port to the dispensing gun.

It is an object of the present invention to provide a dispensing apparatus wherein the volume of fluid material applied to a workpiece is not restricted to the size of the metering cylinder chamber.

It is a further object of the present invention to provide a dispensing apparatus which operates with positive displacement metering which is independent of supply pressure or material viscosity.

It is another object of the present invention to provide a dispensing apparatus which can be repositioned to the end of its stroke without dispensing material.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
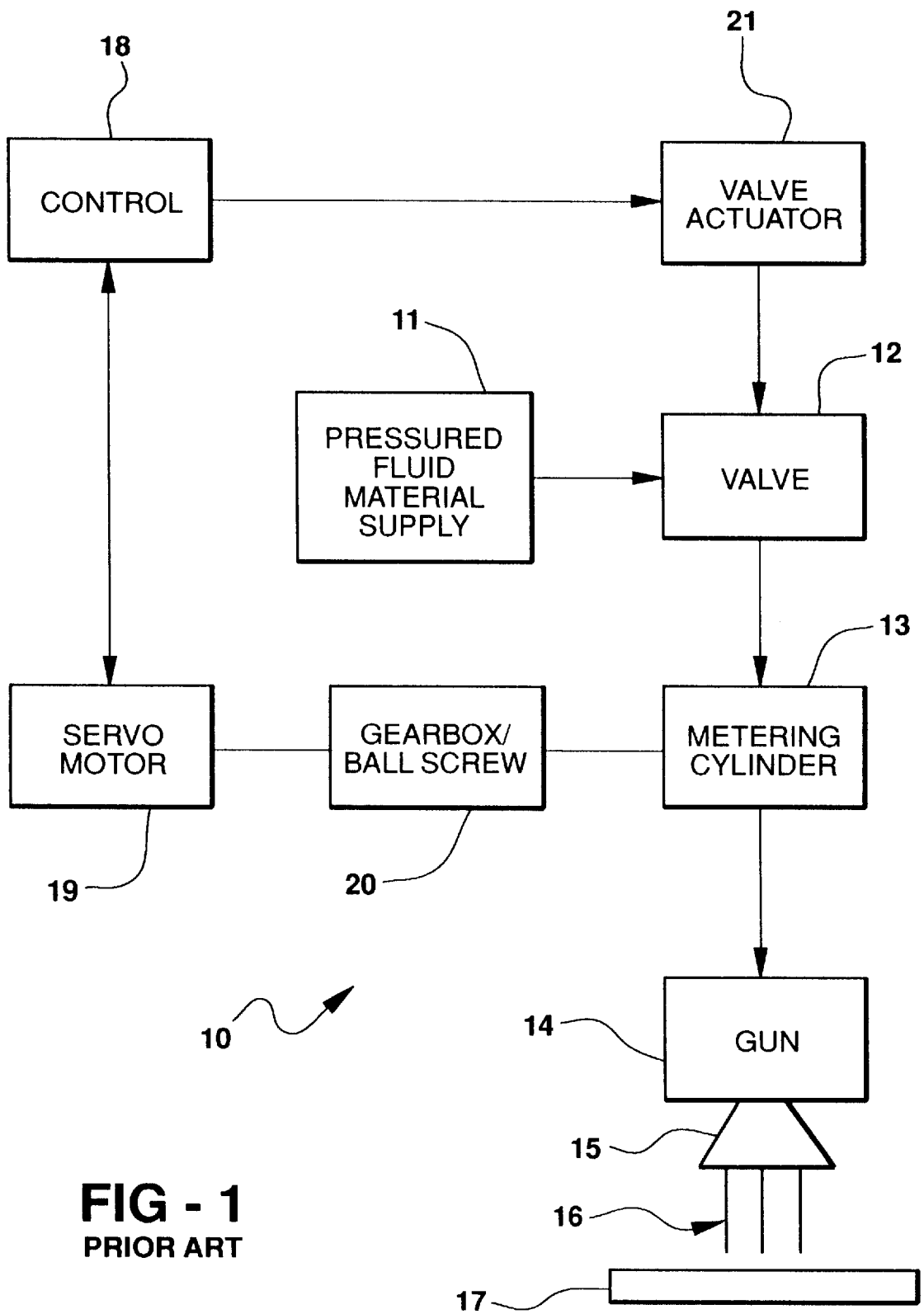
FIG. 1 is a schematic block diagram of a prior art single acting shotmeter for dispensing fluid material.

There is shown in the FIG. 1 a typical single acting shotmeter 10 for use in applying a fluid material, such as a sealer, to an object such as a vehicle body. The shotmeter 10 includes a pressured fluid material supply 11 connected to an inlet of a valve 12 which has an outlet connected to an inlet of a metering cylinder 13. The metering cylinder 13 has an outlet connected to an inlet of a dispense gun 14 which has an outlet at which a nozzle 15 is attached. During a dispense mode of operation, as described below, the shotmeter 10 dispenses a predetermined volume of fluid material 16 from the nozzle 15 onto a surface of a workpiece such as an object 17.

The shotmeter 10 includes a control 18 connected to a servomotor 19. The servomotor 19 has a mechanical output connected to an input of a gearbox/ball screw 20 which in turn is mechanically coupled to the metering cylinder 13. The metering cylinder 13 has an internal chamber (not shown) sized to accommodate the desired volume of fluid material to be dispensed during one cycle of the shotmeter 10. A metering rod or piston (not shown) in the metering cylinder 13 is moved back and forth by the servomotor 19 under the command of control signals generated by the control 18. During a dispense mode of operation, the control 18 commands the servomotor 19 to move the metering rod or piston in a manner to force the fluid material 16 in the chamber of the metering cylinder 13 out of the cylinder outlet, through the gun 14 and the nozzle 15 and onto the object 17. The control 18 is also connected to a valve actuator 21 which is connected to the valve 12. During the dispense mode of operation, the control 18 sends a signal to the valve actuator 21 to close the valve 12 to prevent flow of the fluid material to or from the supply 11. When the fluid material 16 has been forced from the metering cylinder 13, the control 18 sends a command signal to the servomotor 19 to reverse direction and move the metering rod or piston back to its starting position. During this reload mode of operation, the control 18 also sends a command signal to the valve actuator 21 to open the valve 12 permitting the fluid material 16 to flow from the supply 11 through the valve and into the chamber of the metering cylinder 13. At the end of the travel of the metering rod or piston, the metering cylinder chamber is filled with the desired volume of fluid material 16 to begin the next cycle of operation.

Typically, the shotmeter 10 is mounted on a robot arm at a sealer application station adjacent a conveyor system on which the objects are moved. Thus, during the reload mode of operation of the shotmeter 10, the object 17, on which the fluid material 16 has been dispensed, is moved away from the application station by the conveyor and a new object is placed in position under the nozzle 15. As manufacturing processes have evolved, there has been a requirement to apply a greater volume of the fluid material during each cycle and to increase the cycle rate. The combination of large reload volumes and short transfer times creates an increased demand on the sealer supply systems. The large instantaneous flow rates require the addition of supply pumps and larger piping systems to enable the systems to operate.

Figure 2:
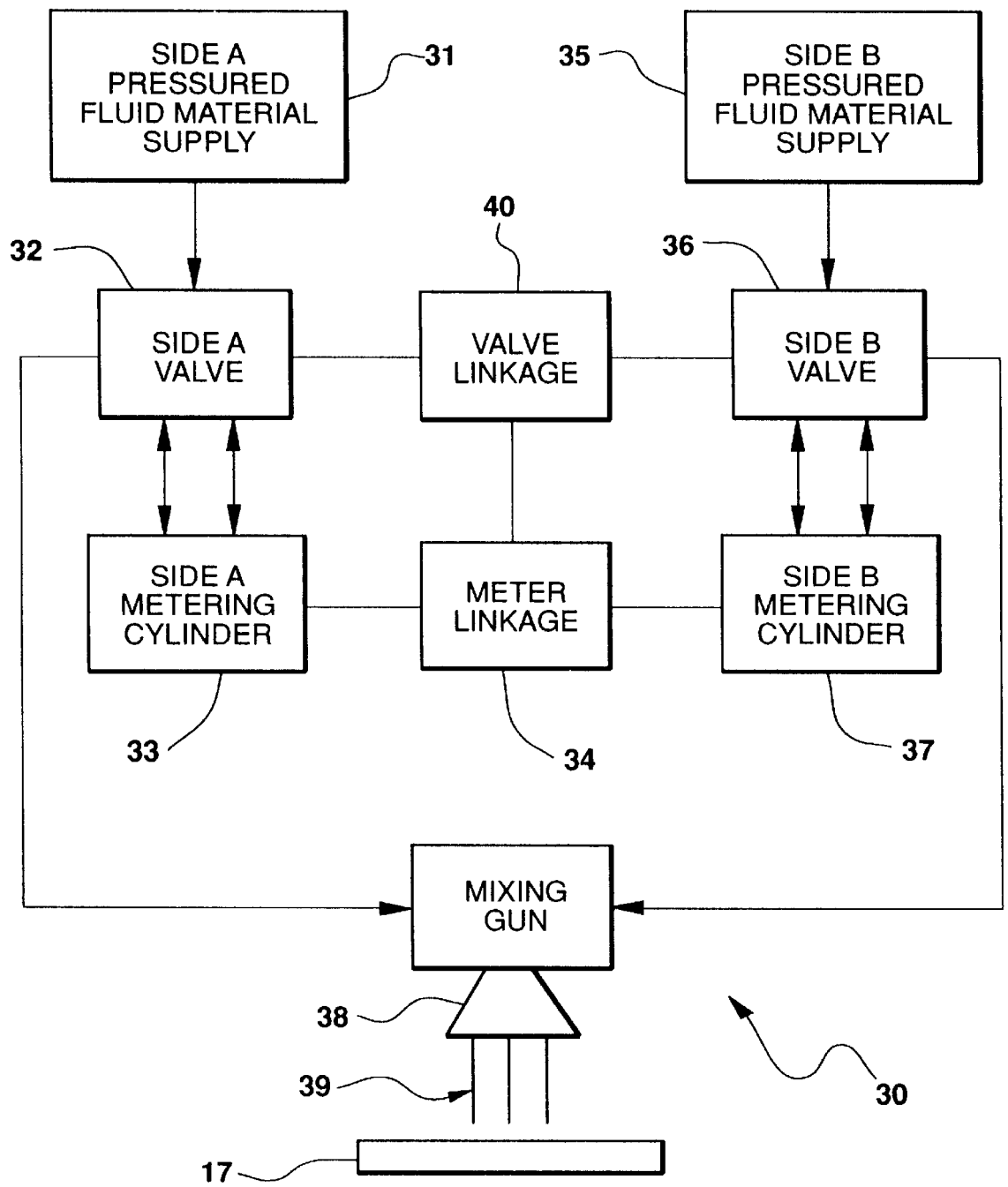
FIG. 2 is a schematic block diagram of a prior art double acting shotmeter for dispensing fluid material.

Another form of known fluid material application systems is a double acting shotmeter 30 as shown in the FIG. 2. A side "A" pressured fluid material supply 31 is a source of a first component of a two component sealing system. The supply 31 is connected to an inlet of a side "A" valve 32. The valve 32 has a pair of inlet/outlet ports which are connected to a corresponding pair of inlet/outlet ports of a side "A" metering cylinder 33. The metering cylinder 33 is of the type which has an internal chamber (not shown) and a piston (not shown) movable in the chamber and located such that one of the inlet/outlet ports is on either side of the piston. An outlet of the valve 32 is connected to a first inlet of a mixing gun 34.

In a similar manner, a side "B" pressured fluid material supply 35 is connected to an inlet of a side "B" valve 36 having a pair of inlet/outlet ports connected to a corresponding pair of inlet/outlet ports of a side "B" metering cylinder 37. An outlet of the valve 36 is connected to a second inlet of the mixing gun 34. The supplies 31 and 35 provide the two components which are combined in the mixing gun 34 and dispensed through a nozzle 38 connected to an outlet of the mixing gun. The mixed components are dispensed through the nozzle 38 as a fluid material 39 which is applied to a surface of the object 17.

The valves 32 and 36 are mechanically coupled together for simultaneous actuation by a valve linkage 40. The metering cylinders 33 and 37 are mechanically coupled together for simultaneous actuation by a meter linkage 41. The meter linkage 41 is mechanically coupled to the valve linkage 40 for simultaneous actuation. In operation, the valve linkage 40 actuates the valves 32 and 36 to permit the side "A" fluid material and the side "B" fluid material respectively to flow into corresponding ends of the chambers in the metering cylinders 33 and 37 respectively. The pressured fluid material flowing into each of the metering cylinders 33 and 37 moves the pistons in these metering cylinders in the same direction. The movement of the pistons is transmitted through the meter linkage 41 to the valve linkage 40. At the same time the two components are flowing into the metering cylinders 33 and 37, portions of the two components previously loaded into the metering cylinders 33 and 37 on the opposite sides of the pistons are being forced out of the metering cylinders through the valves 32 and 36 and flow into the mixing gun 34. When the pistons have been moved to the extent of travel in one direction, the meter linkage 41 and the valve linkage 40 cooperate to switch the valves 32 and 36 connecting the just-emptied sides of the metering cylinders 33 and 37 to the supplies 31 and 35 respectively and connecting the just-filled sides of the metering cylinders to the mixing gun 34. Thus, the material 39 is continuously dispensed through the nozzle 38 until the supplies 31 and 35 are shut off or the valves 32 and 36 are completely closed.

Figure 3:
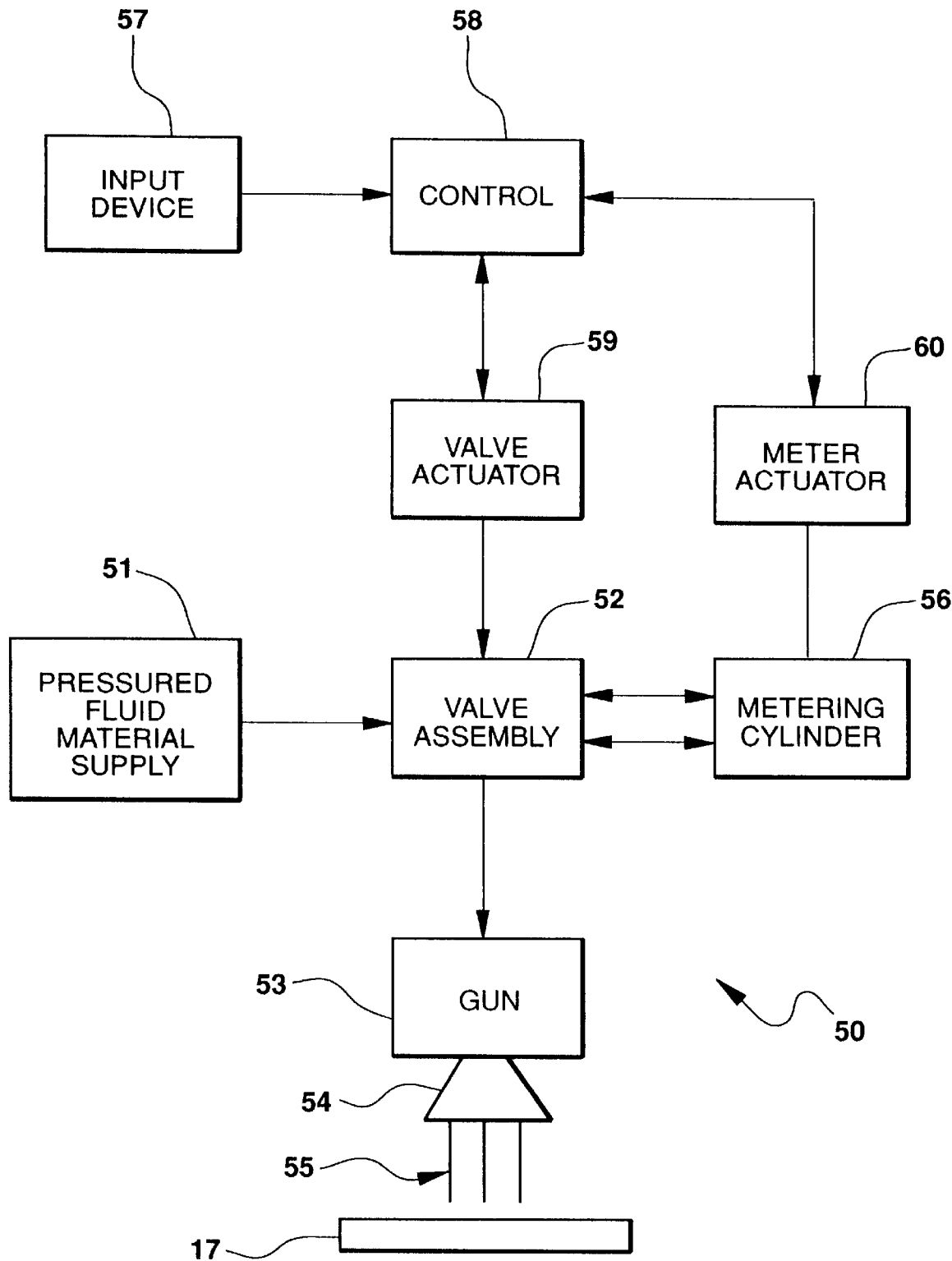
FIG. 3 is a schematic block diagram of an apparatus for dispensing fluid material in accordance with the present invention.

There is shown in the FIG. 3 a fluid material dispensing system 50 in accordance with the present invention. A pressured fluid material supply 51 is connected to an inlet port of a valve 52 having an outlet port connected to an inlet of a dispense gun 53. An outlet of the dispense gun 53 is connected to a nozzle 54 for dispensing fluid material 55 onto a surface of the object 17. The valve 52 has a pair of inlet/outlet ports which are connected to a corresponding pair of inlet/outlet ports of a metering cylinder 56. An input device 57 is connected to an input of a control 58 having an input/output connected to an input/output of a valve actuator 59 which has an output connected to the valve 52. Another input/output of the control 58 is connected to an input/output of a meter actuator 60 which is mechanically coupled to the metering cylinder 56. The input device 57 can be utilized to program the control 58 to generate control signals to the valve actuator 59 and the meter actuator 60 to cycle the valve 52 and the metering cylinder 56 respectively. As described below, the control 58 causes the cyclic dispensing of fluid material from and the reloading of fluid material into a chamber in the metering cylinder on opposite sides of a piston. The control 58 receives feedback signals from the valve actuator 59 and the meter actuator 60 representing the state of the valve 52 and the metering cylinder 56 respectively.

The system 50 operates to continuously dispense the fluid material 55 until a predetermined amount of the fluid material, representing the required length of a strip of the fluid material, has been dispensed on the object 17 representing the completion of a material dispensing cycle. Since the end of the strip can occur at any point in the travel of the metering cylinder piston, the input device 57 is utilized by an operator to generate input signals to program the control 58 to measure the amount of fluid material which has been dispensed and reset the piston to the end of its travel when required. For example, it may be desirable to reset if the next dispensing cycle requires the entire volume of the chamber. The cross-sectional area of the chamber is known such that the control 58 receives a feedback signal from the meter actuator 60 representing the travel of the piston (not shown) in the metering cylinder 56 which travel corresponds to the amount of fluid material dispensed.

The size of the chamber in the metering cylinder 56 is based upon the volume of fluid material required for longest strip to be dispensed. If a strip for a shorter seam is being dispensed, the piston will be positioned somewhere between the ends of the metering cylinder chamber when the end of the seam is reached. The piston can be moved to the end of its stroke to position it for the next cycle by the control 58 switching the valve assembly 52 to permit the flow of fluid from one side of the piston to the other side as the piston is being moved.

Figure 4:
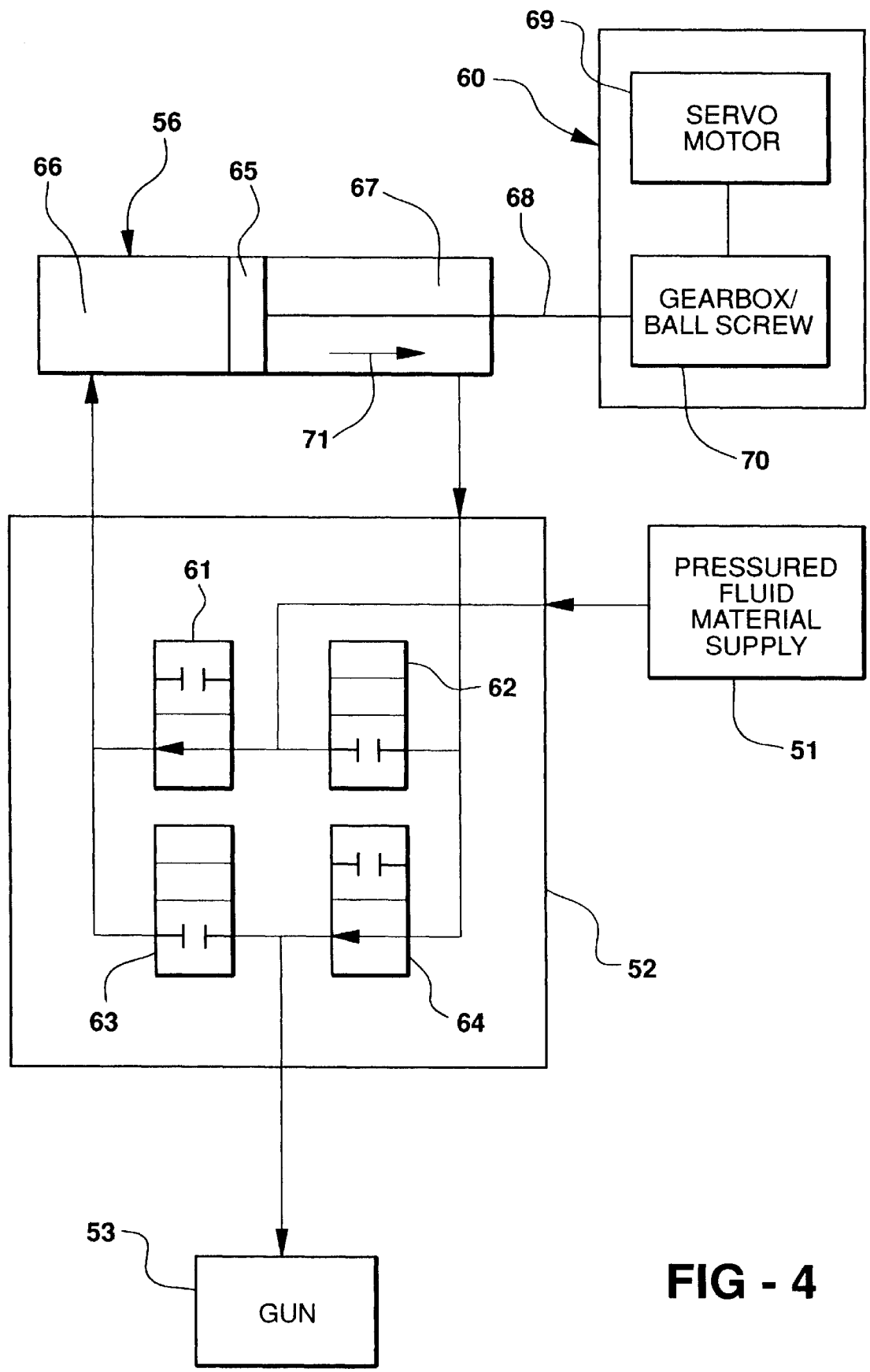
FIG. 4 is a schematic block diagram of the valve assembly, the metering cylinder and the meter actuator shown in the FIG. 3 in a first mode of operation of the fluid dispensing apparatus.

There is shown in the FIG. 4 the valve assembly 52, the metering cylinder 56 and the meter actuator 60 in more detail. The pressured fluid material supply 51 is connected to a first port of a first valve 61 and a first port of a second valve 62 in the valve assembly 52. A third valve 63 and a fourth valve 64 in the valve assembly 52 each have a first port connected to the inlet of the gun 53. The first valve 61 and the third valve 63 each have a second port connected to one of the inlet/outlet ports of the valve assembly 52 which in turn is connected to one of the inlet/outlet ports of the metering cylinder 56. The second valve 62 and the fourth valve 64 each have a second port connected to another one of the inlet/outlet ports of the valve assembly 52 which in turn is connected to another one of the inlet/outlet ports of the metering cylinder 56. The metering cylinder 56 includes a piston 65 which is slidably movable in a chamber formed therein dividing the chamber into a first chamber portion 66 and a second chamber portion 67. The first chamber portion 66 is in fluid communication with the second ports of the first valve 61 and the third valve 63. The second chamber portion 67 is fluid communication with the second ports of the second valve 62 and the fourth valve 64. The piston 65 is mechanically coupled to the meter actuator 60 by a linkage 68. The meter actuator 60 includes a servomotor 69 which has an output mechanically coupled to the linkage 68 by any suitable means such as a gearbox/ball screw 70. The servomotor 69 provides positive displacement metering which is independent of supply pressure or material viscosity.

In the FIG. 4, the valves 61 through 64 are actuated by the valve actuator 59 (FIG. 3) to a first mode of operation wherein fluid material is supplied to the first chamber portion 66 while fluid material is dispensed from the second chamber portion 67. The first valve 61 is actuated to an open position to connect the pressured fluid material supply 51 to the first chamber portion 66. The second valve 62 is actuated to a closed position to block any fluid material flow therethrough. The fourth valve 64 is actuated to an open position to permit the flow of fluid material from the second chamber portion 67 to the gun 53. The third valve 63 is actuated to a closed position to prevent fluid material flow therethrough. The servomotor 69 is actuated to drive the piston 65 in the direction of an arrow 71 to force the fluid material from the second chamber portion 67 through the gun 53 and to expand the volume of the first chamber portion 66 to allow fluid material to flow thereinto from the supply 51.

Figure 5:
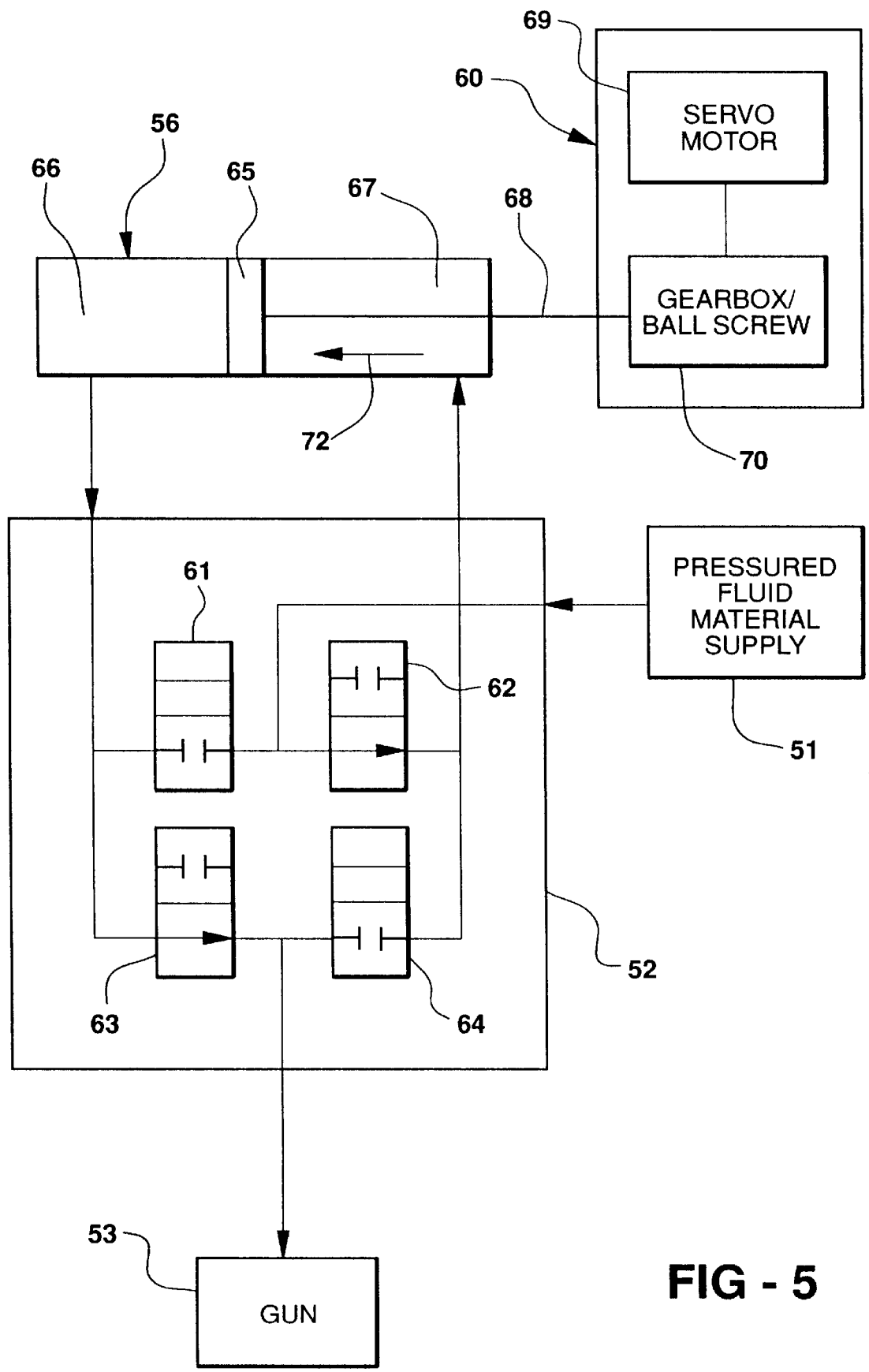
FIG. 5 is a schematic block diagram similar to the FIG. 4 showing a second mode of operation of the fluid dispensing apparatus.

The apparatus according to the present invention is shown in a second mode of operation in the FIG. 5. The valves 61 through 64 each have been actuated to a second position by the valve actuator 59 whereby the valve 61 is closed, the valve 62 is open to permit fluid material to flow from the pressured fluid material supply 51 to the second chamber portion 67 of the metering cylinder 56, the third valve 63 is open to permit fluid material to flow from the first chamber portion 66 to the gun 53 and the fourth valve 64 is closed. The servomotor 69 has been commanded to rotate in the opposite direction driving the piston 65 in a direction of an arrow 72 forcing the fluid material from the first chamber portion 66 and drawing new fluid material into the second chamber portion 67.

Figure 6:
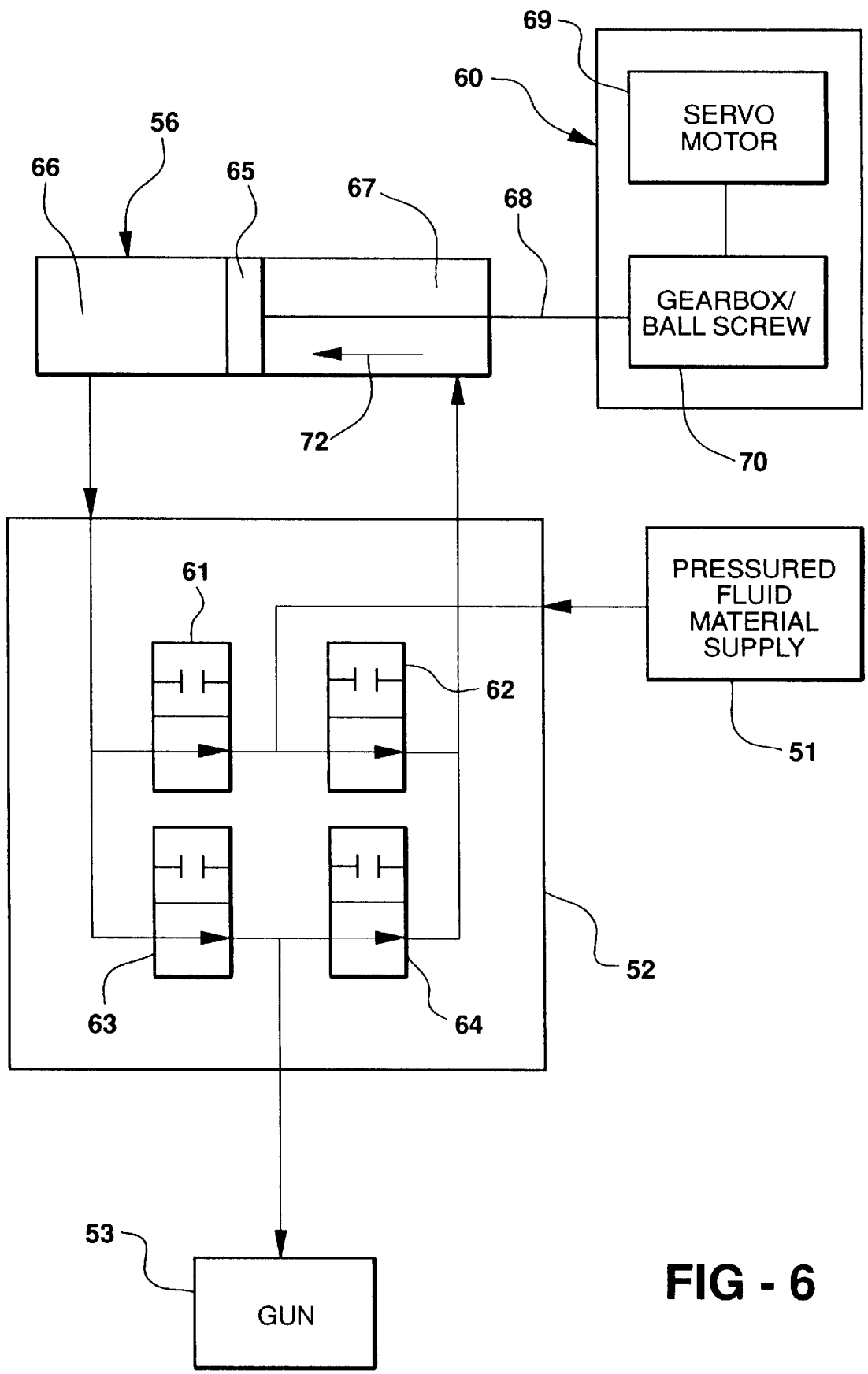
FIG. 6 is a schematic block diagram similar to the FIG. 4 showing a third mode of operation of the fluid dispensing apparatus.

From the FIG. 4 and the FIG. 5, it can be seen that the fluid material dispensing apparatus 50 according to the present invention does not require a reloading pause as does the prior art single acting shotmeter shown in the FIG. 1. The chamber of the metering cylinder 56 is typically sized to a volume which corresponds to the longest strip or bead to be laid down on an object. Thus, a single bead of material can be dispensed during travel of the piston 65 in the first direction shown by the arrow 71 in the FIG. 4 and the apparatus is immediately ready to lay down a subsequent bead of the fluid material during travel of the piston in the opposite direction as shown by the arrow 72 in the FIG. 5. When shorter length beads are desired, the control 58 operates the servomotor 69 for the time required to lay down the desired length of bead. For example, let us say that the piston 65 was moving in the direction of the arrow 71 shown in the FIG. 4 and was stopped at the position shown in the FIG. 6 at the end of a shorter bead of the fluid material. Now the valve assembly 52 is actuated to a third mode of operation wherein all of the valves 61 through 64 are opened. The control 58 controls the servomotor 69 to reverse the direction of the piston 65 so that it travels in the direction of the arrow 72 shown in the FIG. 6. Fluid material in the first chamber portion 66 is forced from the chamber through all of the open valves and into the second chamber portion 67. None of the fluid material is dispensed from the gun 53 since the path of least resistance for the fluid material is from one side of the piston 65 to the other.

In summary, the apparatus 50 for dispensing fluid material from a dispensing gun onto a workpiece includes: the metering means 56,60 having the metering chamber formed therein and the pair of inlet/outlet ports, the metering chamber having the pair of variable volume chamber portions 66,67 each being in fluid communication with one of the inlet/outlet ports; the valve means 52,59 having the inlet port connectable to the supply of fluid material 51, the outlet port connectable to the dispensing gun 53, and the pair of inlet/outlet ports each connected to the associated one of the metering means inlet/outlet ports and being in fluid communication with the associated one of the chamber portions 66,67; and the control means 58 connected to the metering means 56,60 and to the valve means 52,59. When the valve means inlet port is connected in fluid communication with the supply of fluid material 51 and the valve means outlet port is connected to the dispensing gun 53, the control means controls the metering means and the valve means in the first mode of operation to draw fluid material from the supply of fluid material through the valve means into the first one 66 of the chamber portions and to force fluid material from the second one 67 of the chamber portions through the valve means and out the valve means outlet port to the dispensing gun, in the second mode of operation to draw fluid material from the supply of fluid material through the valve means into the second one of the chamber portions and to force fluid material from the first one of the chamber portions through the valve means and out the valve means outlet port to the dispensing gun, and in the third mode of operation to force fluid material in the metering means from one of the chamber portions into the other one of the chamber portions through the valve means without forcing the fluid material from the valve means outlet port to the dispensing gun.

The method for dispensing fluid material from a dispensing gun onto a workpiece according to the present invention includes the steps of: a. providing the metering means 56,60 having a metering chamber formed therein and a pair of inlet/outlet ports, the metering chamber having a pair of variable volume chamber portions 66,67 each being in fluid communication with an associated one of the inlet/outlet ports; b. providing the valve means 52,59 having an inlet port, an outlet port and a pair of inlet/outlet ports each connected to an associated one of the metering means inlet/outlet ports and being in fluid communication with an associated one of the chamber portions 66,67, connecting the inlet port to the supply of fluid material 51 and connecting the outlet port to a dispensing gun 53; and c. providing the control means 58 and connecting the control means to the metering means and to the valve means. The method further includes the steps of: d. operating the control means 58 to control the metering means 56,60 and the valve means 52,59 in a first mode of operation to draw fluid material from the supply of fluid material 51 through the valve means into a first one 66 of the chamber portions and to force fluid material from a second one 67 of the chamber portions through the valve means and out the valve means outlet port to the dispensing gun 53; e. operating the control means 58 to control the metering means 56,60 and the valve means 52,59 in a second mode of operation to draw the fluid material from the supply of fluid material 51 through the valve means into the second one 67 of the chamber portions and to force the fluid material from the first one 66 of the chamber portions through the valve means and out the valve means outlet port to the dispensing gun 53; and f. operating the control means 58 to control the metering means 56,60 and the valve means 52,59 in a third mode of operation to force the fluid material in the metering means from one of the chamber portions 66,67 into the other one of the chamber portions through the valve means without forcing the fluid material from the valve means outlet port to the dispensing gun 53.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An apparatus for dispensing fluid material from a dispensing gun onto a workpiece comprising:

a metering means (56,60) having a metering chamber formed therein and a pair of inlet/outlet ports, said metering chamber having a pair of variable volume chamber portions (66,67) each being in fluid communication with an associated one of said inlet/outlet ports;

a valve means (52,59) having an inlet port connectable to a supply of fluid material (51), an outlet port connectable to a dispensing gun (53), and a pair of inlet/outlet ports each connected to an associated one of said metering means inlet/outlet ports and being in fluid communication with an associated one of said chamber portions (66,67); and a control means (58) connected to said metering means (56,60) and to said valve means (52,59) whereby when said valve means inlet port is connected in fluid communication with the supply of fluid material (51) and said valve means outlet port is connected to the dispensing gun (53), said control means controls said metering means and said valve means in a first mode of operation to draw fluid material from the supply of fluid material through said valve means into a first one (66) of said chamber portions and to force fluid material from a second one (67) of said chamber portions through said valve means and out said valve means outlet port to the dispensing gun, in a second mode of operation to draw the fluid material from the supply of fluid material through said valve means into said second one of said chamber portions and to force the fluid material from said first one of said chamber portions through said valve means and out said valve means outlet port to the dispensing gun, and in a third mode of operation to force the fluid material in said metering means from one of said chamber portions into the other one of said chamber portions through said valve means without forcing the fluid material from said valve means outlet port to the dispensing gun.

2. The apparatus according to claim 1 wherein said control means (58) controls said metering means (56,60) and said valve means (52,59) in at least one of said first and second modes of operation to dispense a predetermined amount of the fluid material from the dispensing gun (53).

3. The apparatus according to claim 2 wherein said control means (58) controls said metering means (56,60) and said valve means (52,59) in said third mode of operation after said predetermined amount of the fluid material has been dispensed from the dispensing gun (53).

4. The apparatus according to claim 1 wherein said control means (58) controls said metering means (56,60) and said valve means (52,59) in said first mode of operation alternately with said second mode of operation to dispense a predetermined amount of the fluid material from the dispensing gun (53).

5. The apparatus according to claim 1 including an input device (57) connected to said control means (58) for generating input signals representing a cycle of operation and said control means responds to said input signals by generating control signals to said metering means (56,60) and said valve means (52,59) to control said metering means and said valve means in at least one of said first and second modes of operation to dispense a predetermined amount of the fluid material from the dispensing gun (53).

6. The apparatus according to claim 1 wherein said metering means (56,60) generates a feedback signal representing the amount of the fluid material dispensed during a material dispensing cycle and said control means (58) responds to said feedback signal by generating control signals to said metering means (56,60) and said valve means (52,59) to control said metering means and said valve means in said third mode of operation to reset said metering means and said valve means for another material dispensing cycle.

7. The apparatus according to claim 1 wherein said metering means (56,60) includes a metering cylinder (56) having said metering chamber, said metering means inlet/outlet ports and said variable volume chamber portions (66,67), and a meter actuator (60) connected between said metering cylinder and said control means (58).

8. The apparatus according to claim 1 wherein said valve means (52,59) includes a first valve (61) and a second valve (62) connected in series between said valve means inlet/outlet ports and a third valve (63) and a fourth valve (64) connected in series between said valve means inlet/outlet ports and connected in parallel with said first valve and said second valve, said valve means inlet port is connected between said first valve and said second valve, and said valve means outlet port is connected between said third valve and said fourth valve.

9. The apparatus according to claim 1 wherein said valve means (52,59) includes a valve assembly (52) having said inlet port, said outlet port and said valve means inlet/outlet ports, and a valve actuator (59) connected between said valve assembly and said control means (58).

10. An apparatus for dispensing fluid material from a dispensing gun onto a workpiece comprising:
   a metering means (56) having a metering chamber formed therein and a piston (65) movable in said metering chamber, said metering chamber and said piston cooperating to form a pair of variable volume chamber portions (66,67) on opposite sides of said piston;
   a meter actuator (60) coupled to said piston (65);
   a valve means (52) having an inlet port connectable to a supply of fluid material (51), an outlet port and a pair of inlet/outlet ports each connected in fluid communication with an associated one of said chamber portions (66,67);
   a valve actuator (59) connected to said valve means (52);
   a dispensing gun (53) connected to said valve means outlet port;
   a control means (58) connected to said valve actuator (59) and to said meter actuator (60) whereby when said valve means inlet port is connected in fluid communication with the supply of fluid material (51), said control means controls said valve actuator and said meter actuator in a first mode of operation to cause said meter actuator move said piston (65) in a first direction (71) to draw fluid material from the supply of fluid material through said valve means into a first one (66) of said chamber portions and to force fluid material from a second one (67) of said chamber portions through said valve means and out said dispensing gun (53), in a second mode of operation to cause said meter actuator to move said piston in a second direction (72) to draw fluid material from the supply of fluid material through said valve means into said second one of said chamber portions and to force fluid material from said first one of said chamber through said valve means and out said dispensing gun, and in a third mode of operation to cause said meter actuator move said piston in a direction to force fluid material in said metering means from one of said chamber portions into the other one of said chamber portions through said valve means without dispensing the fluid material from the dispensing gun.

11. The apparatus according to claim 10 wherein said valve means (52) includes a first valve (61) and a second valve (62) connected in series between said valve means inlet/outlet ports and a third valve (63) and a fourth valve (64) connected in series between said valve means inlet/outlet ports and connected in parallel with said first valve and said second valve, said valve means inlet port is connected between said first valve and said second valve, and said valve means outlet port is connected between said third valve and said fourth valve.

12. An method for dispensing fluid material from a dispensing gun onto a workpiece comprising the steps of:
   a. providing a metering means (56,60) having a metering chamber formed therein and a pair of inlet/outlet ports, said metering chamber having a pair of variable volume chamber portions (66,67) each being in fluid communication with an associated one of said inlet/outlet ports;
   b. providing a valve means (52,59) having an inlet port, an outlet port and a pair of inlet/outlet ports each connected to an associated one of the metering means inlet/outlet ports and being in fluid communication with an associated one of the chamber portions (66,67), connecting the inlet port to a supply of fluid material (51) and connecting the outlet port to a dispensing gun (53);
   c. providing a control means (58) and connecting the control means to the metering means (56,60) and to the valve means (52,59);
   d. operating the control means (58) to control the metering means (56,60) and the valve means (52,59) in a first mode of operation to draw fluid material from the supply of fluid material (51) through the valve means into a first one (66) of the chamber portions and to force fluid material from a second one (67) of the chamber portions through the valve means and out the valve means outlet port to the dispensing gun (53);

e. operating the control means (58) to control the metering means (56,60) and the valve means (52,59) in a second mode of operation to draw the fluid material from the supply of fluid material (51) through the valve means into the second one (67) of the chamber portions and to force the fluid material from the first one (66) of the chamber portions through the valve means and out the valve means outlet port to the dispensing gun (53); and f. operating the control means (58) to control the metering means (56,60) and the valve means (52,59) in a third mode of operation to force the fluid material in the metering means from one of the chamber portions (66,67) into the other one of the chamber portions through the valve means without forcing the fluid material from the valve means outlet port to the dispensing gun (53).

13. The method according to claim 12 wherein said steps d. and e. are performed alternately to dispense a predetermined amount of the fluid material from the dispensing gun (53).

14. The method according to claim 12 wherein said step f. is performed after a predetermined amount of the fluid material has been dispensed from the dispensing gun (53).

* * * * *